United States Patent Office 3,389,128
Patented June 18, 1968

3,389,128
POLYMERIZATION PROCESSES AND CATALYTIC COMPOSITION OF MATTER
John W. Bayer, Perrysburg, and William C. Grinonneau, Toledo, Ohio, assignors to Owens-Illinois, Inc., a corporation of Ohio
No Drawing. Filed June 7, 1965, Ser. No. 462,037
20 Claims. (Cl. 260—93.1)

This invention relates to a process for the polymerization of unsaturated compounds and to a catalytic composition of matter for effecting said polymerization.

The catalytic composition of matter of this invention generally comprises a vanadium or titanium halide and an organic sulfate ester wherein the two catalytic components are presented in critical amounts. The prior art generally discloses catalytic compositions which comprise a transition metal compound and an organic sulphur containing compound for example, see U.S. Patent 3,057,-831, filed Nov. 29, 1957, and U.S. Patent 3,026,311, filed Oct. 14, 1959. The polymerization processes and catalyst systems of this invention are advantageous when compared to these prior art compositions and processes. For example, when the catalytic system and process of this invention are used, excellent polymerization results and yields are obtained with only a two component catalytic system whereas three component catalytic systems are often utilized in the prior art. The catalytic systems of this invention utilize catalysts of the non-free radical type. Accordingly, the decomposition of free radical catalyst components is not a problem when the catalyst system of this invention is utilized. Likewise, the non-free radical catalytic components of this invention are generally cheaper than the prior art free radical type components. The catalyst system as described in this invention utilized metallic halide components which are not stable in water. As such, nonaqueous solvent systems are utilized. The organic sulphur compounds as described in this invention function as true catalysts. This is to be contrasted with prior art systems which utilize organic sulphur containing compounds as emulsifying agents, wetting agents, etc. Likewise, the metal salts as used in the catalyst system of this invention functions as catalysts in comparison with prior art processes wherein these metal salts often serve as a buffering media.

The polymerization processes and catalyst systems of this invention are adapted to the polymerization of a wide range of monomeric compounds containing conjugated double bonds. Specific examples of compounds of this type are generally represented by the formula

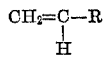

wherein R is a member such as vinyl, phenyl, and vinyl phenyl.

The catalyst system and processes of this invention are particularly suited to the polymerization of monomeric 1,3-cyclooctadiene.

The catalyst system of this invention generally comprises a metallic halide and an organic sulfate ester. Metallic halides of the type suited for use in this invention are represented by the formula $MX_n$ wherein M is a metal such as titanium and vanadium; X is a member such as fluorine, chlorine, bromine and iodine, and;
n is an integer equal to the primary valence of M.

The subject invention is particularly suited to the use of titanium tetrachloride as a metallic halide component.

The catalytic mixture according to this invention can contain from about 0.1 to about 5 percent of the metallic halide component. The most preferred range of concentration for the metallic halide component is from about 0.5 to about 2 percent. A most preferred percentage being about 1 percent. The above described catalytic percentages are based on the polymerization mixture containing the monomer, exclusive of the solvent.

The organic sulfate ester component of the catalyst system of this invention is generally represented by the formula

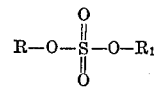

wherein R and $R_1$ independently are hydrocarbon radicals such as alkyl, aryl, alkaryl, aralkyl having a maximum of seven carbon atoms. It is preferred that R and $R_1$ are independently alkyl having from one to four carbon atoms.

More preferred organic sulfate esters adapted for use in this invention are dimethyl sulfate and diethyl sulfate.

The catalytic composition of this invention can contain from about 0.1 to about 5 percent of the organic sulfate ester. A most preferred percentage for the sulfate ester is from about 0.5 to about 2 percent with a most preferred percentage being 1 percent. The above described catalytic percentages are based on the polymerization mixture containing the monomer, exclusive of the solvent.

The polymerization process of this invention utilizing the catalyst system of this invention can be carried out at a temperature of from about −50 to about 100° C. A most preferred range of operating temperatures is from about 25 to about 50° C. with a most preferred range of operating conditions being from about 45 to about 50° C.

The polymerization sequence of this invention can be carried out for any period of time from about 5 minutes to about 24 hours. A preferred range of operating time is from about ¼ hour to about 2 hours with a most preferred range of operating time being from about 1½ to about 2 hours.

The polymerization technique of this invention using the catalyst of this invention is carried out in the presence of a solvent such as an aliphatic or aromatic hydrocarbon. Representative examples of suitable solvents include benzene, xylene, toluene, hexane, heptane, etc.

The polymerization process of this invention when operating on a batch basis can utilize a ratio of catalyst to monomer from about .001 to about .005. A more preferred ratio for the catalyst to monomer is from about .001 to about .01, with a most preferred ratio being from about .005 to about .001. Likewise, it should be noted that a monomeric stream can be continuously contacted with a catalyst bed in a process wherein there is no fixed catalyst to monomer ratio.

The polymerization process as described in this invention can be carried out at a pressure of from about atmospheric to about 30 p.s.i.g A more preferred operating range of pressures is from about atmospheric to about 20 p.s.i.g. with a most preferred operating pressure being atmospheric.

It is obvious to one skilled in the art that the optimum conditions for any given monomeric compound depends on the characteristics of said monomeric compound. It is likewise obvious to one skilled in the art that a polymerization reaction utilizing the process and catalyst of this invention can be carried out on a continuous basis by continuously contacting monomeric material with a catalyst bed. Likewise, the process of this invention can be carried out on a batch basis by charging an autoclave with a fixed amount of a catalyst and a monomeric material.

The following examples will illustrate the preparation of polymeric compositions by means of the subject invention. These examples are given for purposes of illustration and not for purposes of limiting this invention.

Example I

One milliliter of dimethyl sulfate, one milliliter of titanium tetrachloride and 150 milliliters of benzene were added to a 250-milliliter flask which was cooled by an acetone-Dry Ice bath. Twenty milliliters of styrene monomer was then added and the temperature was allowed to rise to 15° C. Upon agitation a precipitate was formed and the temperature was allowed to drop to 2° C. at which point the reaction mixture solidified. The temperature of the reaction mixture was maintained within the range of 0° C. to 10° C. for 2 hours and then warmed to room temperature. 15.9 grams of polystyrene was recovered from the reaction mixture through washing with methanol. This represented an 89 percent conversion of monomeric styrene to polystyrene.

Example II

Utilizing the procedure as described in Example I, substituting heptane for benzene as a solvent the temperature dropped to approximately −30° C. during the reaction sequence. The precipitate upon washing yielded 4 grams of polystyrene. This represented a yield of 22.4 percent from monomeric styrene to polystyrene.

Example III

One milliliter of titanium tetrachloride, one milliliter of diethyl sulfate, 20 milliliters of monomeric styrene and 150 milliliters of benzene was placed in a 250-milliliter flask. Upon addition of the reaction components, the temperature of the reaction mixture rose to 55° C. This temperature was maintained for a period of one hour without external heat. The temperature was then lowered to 50° C. and this temperature held for a period of 15 hours, at which time the reaction mixture was hydrolyzed with methanol. A yield of 15.6 grams of polystyrene was recovered. This represents a 87.2 percent conversion from monomeric styrene to polystyrene.

Example IV 125 milliliters of benzene, 1 milliliter of titanium tetrachloride and 20 milliliters of styrene was mixed in a 250-milliliter flask. When the components were added the temperature did not rise. Heat was then applied from an external source to raise the temperature to 45° C. This temperature being maintained for 2 hours. Upon hydrolysis with methanol, a yield of only 0.5 gram of polystyrene resulted. This represents a yield of 2.8 percent from monomeric styrene to polystyrene.

Example V

Using the procedure as described in Example IV, 1 milliliter of dimethyl sulfate was substituted for the titanium tetrachloride. Upon hydrolysis with methanol no polymer was obtained as a product.

Example VI 1 milliliter of titanium tetrachloride, 1 milliliter of dimethyl sulfate and 300 milliliters of benzene was added to a reaction flask. Butadiene was continuously passed through this reaction flask at a constant pressure of 20 p.s.i.g. The temperature of the reaction mixture was maintained at 50° C. and the reaction was allowed to proceed for 2 hours. 0.3 gram of polymer resulted, which was shown by infrared analysis to be a mixture of cis- and trans-polybutadiene.

Example VII

To a 250-milliliter reaction flask was added 1 milliliter of titanium tetrachloride, 1 milliliter of dimethyl sulfate, 125 milliliters of benzene and 20 milliliters of 1,3-cyclooctadiene. The temperature of the reaction mixture was allowed to raise to 50° C. This temperature being retained throughout the polymerization reaction sequence. The reaction time was 2 hours. 3.5 grams of poly-1,3-cyclooctadiene was achieved for a 20 percent yield. Infrared analysis showed this to be a polymeric linear hydrocarbon.

Example VIII

To a 250-milliliter reaction flask, 1 milliliter of vanadium oxychloride along with 125 milliliters of benzene, 1 milliliter of dimethyl sulfate and 20 milliliters of styrene was added. The temperature of the reaction mixture was allowed to raise to 50° C. and this temperature was maintained. After 2 hours, 15.6 grams of polystyrene was recovered from the reaction mixture through washing with methanol. This represented an 80 percent conversion of monomeric styrene to polystyrene.

Example IX

One milliliter of dimethyl sulfate and one milliliter of titanium tetrachloride was added to a 250-milliliter flask. To this flask was also added 125 milliliters of benzene and 20 milliliters of divinyl benzene. The temperature of the reaction mixture was allowed to raise to 50° C. and the reaction was allowed to proceed for 2 hours. At the end of that time 16 grams of polydivinyl benzene was separated from the reaction mixture. This represents a 90° percent conversion of monomeric divinyl benzene to polydivinyl benzene.

What is claimed is:

1. A process for the polymerization of monomers having conjugated double bonds which comprises contacting such compositions with at least a catalytic amount of a catalytic composition comprising a compound represented by the formula $$MX_n$$

wherein
M is a metal selected from the group consisting of titanium and vanadium,
X is a halide, and;
$n$ is an integer equal to the primary valence of M, and a compound represented by the formula $$R-O-\underset{\underset{O}{\|}}{\overset{\overset{O}{\|}}{S}}-O-R_1$$

wherein
R and $R_1$ independently are hydrocarbon radicals having from one to seven carbon atoms.

2. A process for the polymerization of a monomer selected from the group consisting of compounds represented by the formula $$CH_2=\underset{H}{\overset{|}{C}}-R$$

wherein
R is a member selected from the group consisting of vinyl, phenyl and vinyl phenyl,
and 1,3-cyclooctadiene
which comprises contacting such compositions with at least a catalytic amount of a catalytic composition comprising a compound represented by the formula $$MX_n$$

wherein
M is a metal selected from the group consisting of titanium and vanadium;
X is a halide, and;
$n$ is an integer equal to the primary valence of M, and a compound represented by the formula $$R-O-\underset{\underset{O}{\|}}{\overset{\overset{O}{\|}}{S}}-O-R_1$$

wherein
R and $R_1$ independently are hydrocarbon radicals having from one to seven carbon atoms, 3. A process for the polymerization of a monomer selected from the group consisting of compounds represented by the formula $$CH_2 = C - R$$
$$\phantom{CH_2=C-}|$$
$$\phantom{CH_2=C-}H$$

wherein
R is a member selected from the group consisting of vinyl, phenyl and vinyl phenyl, and 1,3-cyclooctadiene
which comprises contacting said monomeric compounds with at least a catalytic amount of a catalytic mixture comprising from about 0.1 to about 5 percent of a titanium tetrachloride and from about 0.1 to about 5 percent of a compound represented by the formula $$R-O-\underset{\underset{O}{\|}}{\overset{\overset{O}{\|}}{S}}-O-R_1$$

wherein
R and $R_1$ independently are hydrocarbon radicals having from one to seven carbon atoms.

4. A process for the polymerization of styrene which comprises contacting monomeric styrene with at least a catalytic amount of a catalytic mixture comprising from about 0.1 to about 5 percent of a compound represented by the formula $$MX_n$$

wherein
M is a metal selected from the group consisting of titanium and vanadium;
X is a halide; and,
$n$ is an integer equal to the primary valence of M, and from about 0.1 to about 5 percent of a compound represented by the formula $$R-O-\underset{\underset{O}{\|}}{\overset{\overset{O}{\|}}{S}}-O-R_1$$

wherein
R and $R_1$ independently are hydrocarbon radicals having from one to seven carbon atoms.

5. The process of claim 1 wherein the polymerization is carried out at a temperature of from about −50 to about 100° C.

6. The process of claim 2 wherein the polymerization is carried out at a temperature of from about −50 to about 100° C.

7. The process of claim 3 wherein the polymerization is carried out at a temperature of from about −50 to about 100° C.

8. The process of claim 4 wherein the polymerization is carried out at a temperature of from about −50° to about 100° C.

9. A process for the polymerization of styrene which comprises contacting monomeric styrene with at least a catalytic amount of a catalytic mixture comprising from about 0.1 to about 5 percent titanium tetrachloride and from about 0.1 to about 5 percent of a compound represented by the formula $$R-O-\underset{\underset{O}{\|}}{\overset{\overset{O}{\|}}{S}}-O-R_1$$

wherein
R and $R_1$ independently are alkyl radicals having from one to four carbon atoms.

10. A process of claim 1 wherein the polymerization is carried out at a temperature of from about 25 to about 50° C. for a period of time of from about ¼ to about 2 hours in the presence of a solvent selected from the group consisting of aliphatic and aromatic hydrocarbons wherein the molar ratio of catalysts to monomer is from about 0.001 to about .05.

11. A process of claim 2 wherein the polymerization is carried out at a temperature of from about 25 to about 50° C. for a period of time of from about ¼ to 2 hours in the presence of a solvent selected from the group consisting of aliphatic and aromatic hydrocarbons wherein the molar ratio of catalysts to monomer is from about 0.001 to about .05.

12. A process of claim 3 wherein the polymerization is carried out at a temperature of from about 25 to about 50° C. for a period of time of from about ¼ to about 2 hours in the presence of a solvent selected from the group consisting of aliphatic and aromatic hydrocarbons wherein the molar ratio of catalysts to monomer is from about 0.001 to about .05.

13. A process of claim 4 wherein the polymerization is carried out at a temperature of from about 25 to about 50° C. for a period of time of from about ¼ to about 2 hours in the presence of a solvent selected from the group consisting of aliphatic and aromatic hydrocarbons wherein the molar ratio of catalysts to monomer is from about 0.001 to about .05.

14. A process for the polymerization of styrene which comprises contacting monomeric styrene with a catalytic mixture comprising 0.5 percent titanium tetrachloride and 0.5 percent of dimethyl sulfate, wherein the polymerization is carried out a temperature of from about 25 to about 50° C. for a period of time from about ¼ to about 2 hours in the presence of benzene wherein the molar ratio of catalyst to monomer is from about .001 to about .01.

15. A process for the polymerization of styrene which comprises contacting monomeric styrene with a catalytic mixture comprising 0.25 percent titanium tetrachloride and 0.25 percent of dimethyl sulfate wherein the polymerization is carried out at a temperature of 45° C. for 2 hours in the presence of benzene wherein the molar ratio of catalyst to monomer is .005.

16. A process for the polymerization of 1,3-cyclooctadiene which comprises contacting monomeric 1,3-cyclooctadiene with a catalytic mixture comprising 5 percent titanium tetrachloride and 5 percent of dimethyl sulfate wherein the polymerization is carried out at a temperature at 50° C. for 2 hours in the presence of benzene wherein the molar ratio of catalyst to monomer is 0.02.

17. A catalytic composition of matter for the polymerization of unsaturated compounds comprising a compound represented by the formula $$MX_n$$

wherein
M is a metal selected from the group consisting of titanium and vanadium;
X is a halide; and,
$n$ is an integer equal to the primary valence of M, and a compound represented by the formula $$R-O-\underset{\underset{O}{\|}}{\overset{\overset{O}{\|}}{S}}-O-R_1$$

wherein
R and $R_1$ independently are hydrocarbon radicals having from one to seven carbon atoms.

18. A catalytic composition of matter for the polymerization of unsaturated compounds comprising from about 0.1 to about 5 percent of a compound represented by the formula $$MX_n$$

wherein
M is a metal selected from the group consisting of titanium and vanadium;
X is a halide; and,
n is an integer equal to the primary valence of M, and from about 0.1 to about 5 percent of a compound represented by the formula

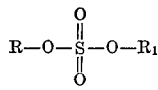

wherein
R and R₁ independently are alkyl radicals having from one to four carbon atoms.

19. A catalytic composition of matter for the polymerization of unsaturated compounds comprising from about 0.1 to about 5 percent of titanium tetrachloride and from about 0.1 to about 5 percent of a compound represented by the formula

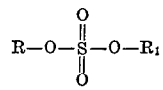

wherein
R and R₁ independently are alkyl radicals having from one to four carbon atoms.

20. A catalytic composition of matter for the polymerization of unsaturated compounds which comprise about one percent of titanium tetrachloride and about one percent of dimethyl sulfate.

No references cited.

JOSEPH L. SCHOFER, *Primary Examiner.*

L. EDELMAN, *Assistant Examiner.*